United States Patent [19]

Kompelien

[11] 4,172,982
[45] Oct. 30, 1979

[54] TIME PROPORTIONAL CONTROL MEANS WITH A VARIABLE TIME CONSTANT

[75] Inventor: Arlon D. Kompelien, Richfield, Minn.

[73] Assignee: Honeywell Inc., Minneapolis, Minn.

[21] Appl. No.: 893,858

[22] Filed: Apr. 6, 1978

[51] Int. Cl.² ............................................. H05B 1/02
[52] U.S. Cl. .................................. 307/117; 307/97; 219/492; 320/1
[58] Field of Search ................. 307/117, 97; 219/492, 219/497, 501, 510; 320/1

[56] References Cited
U.S. PATENT DOCUMENTS

| 3,523,182 | 8/1970 | Phillips | 307/117 |
| 3,873,906 | 3/1975 | Perlman | 320/1 |
| 3,964,677 | 6/1976 | Schalow | 219/492 |

Primary Examiner—L. T. Hix
Assistant Examiner—S. D. Schreyer
Attorney, Agent, or Firm—Alfred N. Feldman

[57] ABSTRACT

A condition responsive time proportional control means which has a relatively fast time constant when operating in its proportional band has the time constant expanded by means of a digital counter. The counter is a resettable unidirectional type counter. The output of the counter drives a switch means and a load along with a means for altering the time constant of the condition responsive time proportional control means. The time constant is altered by a switching means that changes the charge and discharge path of a capacitor used in creating the time constant.

12 Claims, 10 Drawing Figures

TIME PROPORTIONAL CONTROL MEANS WITH A VARIABLE TIME CONSTANT

CROSS-REFERENCE TO RELATED APPLICATION

The present application is related to a concept disclosed in an application filed on Jan. 27, 1978 having Ser. No. 872,867, in the name of Arlon D. Kompelien and assigned to the assignee of the present application.

BACKGROUND OF THE INVENTION

Time proportional control systems that are condition responsive are known. One of the major applications of this type of condition responsive control system is in the control of heating and cooling equipment. The present invention is generally applicable to any type of condition control system that utilizes a condition responsive time proportional control, but will be generally described in terms of a thermostatically controlled system or thermostat.

A thermostat typically uses thermal anticipation to obtain a better system performance. This anticipation reduces the dependence on the ambient space temperature to actuate the thermostat between its "on" and "off" condition. Various means are used to obtain the anticipation heat, but all of these are thermal and are, therefore, subject to the different air flows that exist in different installations. If the actual air flow over the thermostat is a particular application is greater or less than the air flow the thermostat was designed for, the actual temperature rise of the sensor due to the anticipator will be reduced or enhanced. This will result in less than optimum performance. A similar effect will occur if the air flow changes from time to time in a given installation. If the air flow is constant, the anticipator can be readjusted to bring back optimum performance, but in changing air flow conditions, no one setting will be optimum. It should be noted that in most thermostats, a change in the characteristics of the anticipator will also change the entire system droop.

In an electronic thermostat, anticipation can be achieved electronically. This has the advantage of not being affected by air flow and thus eliminates all of the problems associated with thermal anticipation as noted above. One method of obtaining this type of anticipation is the use of a resistor and a capacitor charge and discharge arrangement as part of the negative feedback in an electronic amplifier while using a fixed positive feedback. This type of electronic anticipation is injected as a negative feedback mode with a single order time constant. For proper operation, this time constant may need to be in the order of 16 minutes. To obtain this type of a time constant with a single resistor-capacitor arrangement requires high resistances and a very low leakage, large capacitor. This arrangement makes obtaining this type of electronic anticipation impractical. The size of the resistors and capacitor would place a burden on the cost of the device, and on the physical size of the thermostat itself.

To obtain the desired time constant of approximately 16 minutes, a relatively small capacitor and reasonably sized resistors can be used thereby obtaining the relatively fast cycling rate in the time proportional control circuit. This relatively fast cycling rate can then be directly counted. If a counter is allowed to count up at a given rate during the "on" time of the anticipation, and another counter is allowed to count up at the same rate during the "off" time, we would have a digital representation of the "on" and "off" time periods for the desired operating condition (this is the actual deviation from the setpoint of the room temperature). The sum of these two counters is the cycling period. This type of information gives a complete description of the cycling pattern of the system for a constant input of a given magnitude. If the average room temperature and the setpoint remain constant, we could then let the cycling pattern continue, but no longer allow the counters to count up. Each time the "on-off" action of the comparator or electronics occurs, the time counter would be reduced by one count. When the counter reaches zero counts, the system will turn "off". The "off-on" action of the comparator or electronic amplifier would then start to count down the "off" time counter. When the "off" time counter reaches zero, this system would then turn "on" and the counter would be allowed to count up at the given rate. This multiplies the "on" and "off" period of the number of counts stored in the counter. Since the basic "on" and "off" periods are determined by a constant, the concept also effectively mutliplies by the same constant. To keep the system closer to the actual operating conditions, the "off" period counter can be updated each time the "on" period counter is counted down. Similarly, the "on" period counter can be updated each time the "off" period counter is counted down. As thus described, the system will work well as long as the comparator is cycling. However, if a setpoint change is made or the deviation from the setpoint is such that the cycling stops, there is a possibility that the control can go out of "phase". That is, the furnace can be "on" when it should be "off", or the opposite can occur. Therefore, some means must be provided that will sense when these conditions occur and force the output into the proper state. One way would be to use two level detectors which would force the output into the proper state when the deviation from the setpoint is greater than the maximum anticipation signal or when the deviation is effectively negative. This method would involve a very critical calibration. An expanded time constant control system utilizing the up-down counters has been fully disclosed and claimed in a prior application. That system utilized a time proportional control system coupled with an up-down counter and a pulse generating means that had a signal combined in the counter to expand the time constant. The use of an up-down counter entailed certain complexities that may be avoided or simplified.

One simplification was the use of a time proportional circuit utilizing a relatively small capacitor and resistors, and a rapid cycling rate. This rapid cycling rate is then sensed by a unidirectional counter that forms part of a counting means. The unidirectional counter, in one simple form, is a ripple counter. The cycling rate of the time proportional control is combined with a pulse generating means so that the time constant of the overall control system can be multiplied by the pulse rate of the pulse generating means. That arrangement utilized a readily available type of digital counter. It further had the advantage that the system never could go out of synchronization with the state of the condition being responded to even if there was a sudden change in the condition or a sudden change in the setpoint of the condition responsive system. That type of system, however, required the use of both a unidirectional type of counter and a pulse generating means to provide the necessary control.

SUMMARY OF THE INVENTION

The present invention involves a condition responsive time proportional control that has been specifically disclosed as a temperature responsive control means for a thermostat. The time proportional circuit utilizes a relatively small capacitor and resistors, and has a relatively rapid cycling rate. This rapid cycling rate is sensed by a unidirectional counter that forms part of a counting means. The unidirectional counter, in one simple form, is a ripple counter. The cycling rate of the time proportional control means is fed directly to the counting means and the counting means provides an output that performs both the final output switching control and a control function for the unique portion of the present disclosure. The counting means output is fed back to a time constant altering means that changes the time constant of the time proportional control means depending on the state of the counter, and provides a highly simplified type of control.

In the simplest form, the time constant altering means could be a pair of back-to-back diodes that are switched by a relay to provide a rapid charge or discharge path for the capacitor used in establishing the time constant for the time proportional control means. The switching arrangement could be a solid state switching arrangement as well as a simple relay control arrangement.

DESCRIPTION OF THE PREFERRED EMBODIMENT

Figure 1:
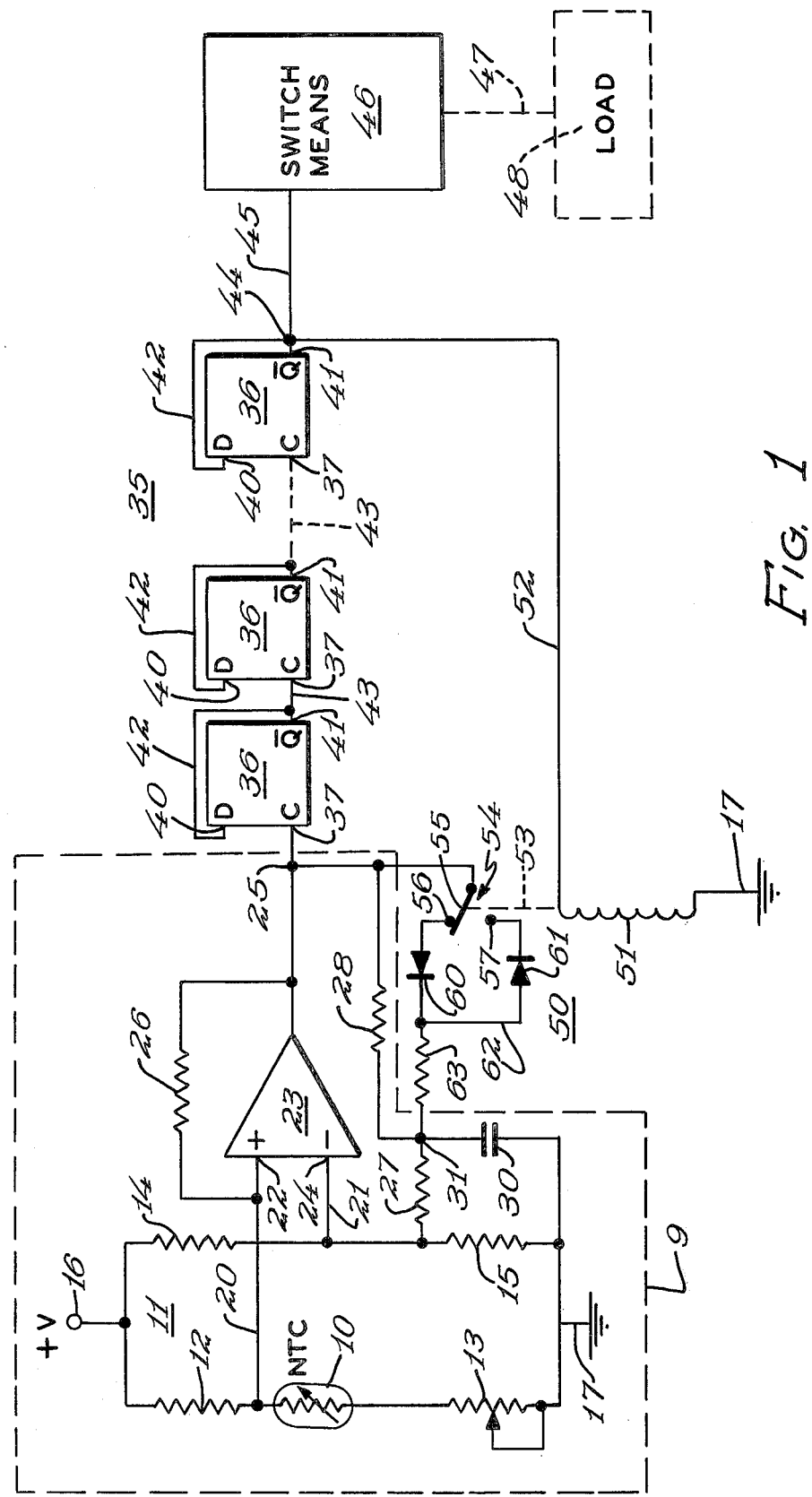
FIG. 1 is a schematic representation of an entire condition control device.

A complete condition control device is disclosed in FIG. 1. While the present condition control device can respond to any type of condition responsive means, the description would be generally directed to a thermostat or temperature responsive type of condition control device. A condition responsive time proportional control means is generally disclosed at 9. A condition responsive element 10, disclosed as a temperature responsive resistor, is provided in a bridge circuit 11 that includes a further resistor 12 and a setpoint potentiometer 13 as one leg of the bridge. The second leg of the bridge includes a voltage divider made up of the resistors 14 and 15. The bridge means 11 is energized from a potential generally connected at terminal 16 with a common or ground 17. If the presently disclosed device were a thermostat and the temperature responsive resistor 10 was used, it would normally be a negative temperature coefficient resistor for sensing and controlling the ambient temperature while the setpoint potentiometer 13 would establish the point of control for the system.

The output of the bridge 11 is on a pair of conductors 20 and 21 with the conductor 20 connected to the non-inverting terminal 22 of an operational amplifier 23, while an inverting terminal 24 is connected to the conductor 21. The operational amplifier 23 has an output at the junction 25. Between the junction 25 and the conductor 20, a positive feedback resistor 26 is provided to create a positive differential for the system. Between the junction 25 and the conductor 21, a further pair of resistors 27 and 28 are provided along with a capacitor 30 that is connected at a common point 31 between the resistors 27 and 28. The network of resistors and capacitor between the junction 25 and the inverting terminal 24 of the operational amplifier 23 provides a time proportional negative feedback which is responsible, along with the resistors 14 and 15 for a time constant in the control devices operation. In the present disclosure, the time constant created by the resistors 14, 15, 27 and 28, and the capacitor 30 is a relatively short time constant, and is the time constant which is altered for control of the balance of the system. The charge and the discharge of the capacitor 30 is regulated by the associated resistors, and the circuitry described to this point forms the condition responsive time proportional control means 9 which ultimately has a switched output. This general type of condition responsive time proportional control means is in and of itself known, but its normal operation is with a time constant that is too short for the use in an effective residential home temperature control system. The wave form of the charge and discharge of the capacitor 30 is disclosed in FIGS. 3a, 4a, 5a, and 6a as taken at the junction 31 for different operating conditions. A repetitively switched output signal is disclosed in FIGS. 3b, 4b, 5b, and 6b for different operating conditions and is taken at the junction 25.

Figure 3A:
FIGS. 3 through 6 are graphic representations of voltage versus time of portions of the condition control device under four different conditions of operation.
Figure 3B:
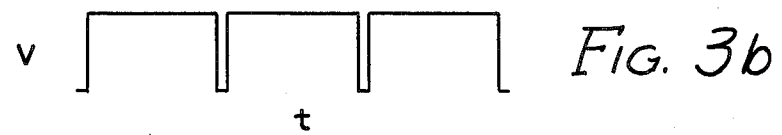
Figure 4A:
Figure 4B:
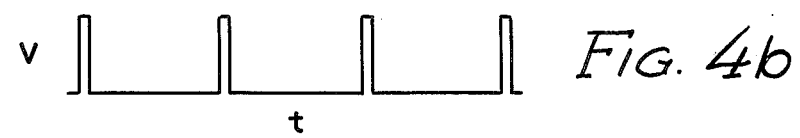

If the wave forms of FIGS. 3a and 3b are noted, they represent one operating condition for the system. In considering this operating condition it should be noted that the time constant established by the resistors and capacitor 30 in the time proportional control means 9 establishes an "on" and "off" switching function for the operational amplifier 23 based on the resistance-capacitor characteristics of the feedback circuitry. As long as the temperature of the control system is within a preselected range, this cycling action will take place. The "on" and "off" periods of time will vary depending on how close to the control point the temperature actually is. The effect of this cycling will be described in more detail after a description of the entire system has been provided. In FIG. 3b the output of the operational amplifier 23 at the junction 25 is disclosed for a cycling rate represented by the charge and discharge of capacitor 30 as noted in FIG. 3a. The output voltage at the junction 25 is either "on" which represents a digital 1, or is "off" which represents a digital 0 for the balance of the system. In the disclosures of FIGS. 3a and 3b the "on" and "off" periods of time are quite unequal, and the 1 provided has a much longer time interval than the 0 provided as an output voltage at junction 25. As has been noted, this will vary depending on how close to the balance condition the bridge means is, and the wave forms of FIGS. 4a, 4b, 5a, 5b, 6a and 6b represent three additional conditions of the "on" or "off" modes of operation. Each bridge balance condition could be represented by pairs of the wave forms shown in FIGS. 3 to 6.

A counting means 35 is disclosed as connected to the junction 25 to receive the repetitively switched output signals of the condition responsive control means 9. The counting means 35, in its simplest form, is a unidirectional ripple counter made up of a plurality of C-D flip flops 36. Each of the C-D flip flops 36 has a clock input 37 and a D type terminal 40. The C-D flip flop 36 also has a $\overline{Q}$ output 41 with the $\overline{Q}$ output 41 connected by conductors 42 back to the D inputs 40. The $\overline{Q}$ output 41 of each stage of the C-D flip flops is connected to the following clock input 37 by conductors 43 and a sufficient number of stages are provided to count up any desired number of digital pulses. The final output of the counting means 35 is provided at the junction 44 where the last stage $\overline{Q}$ output 41 is connected by the conductor 42 to the input terminal 40 of the last stage. The arrangement described for the counting means 35 is a conventional ripple counter and is capable of counting in exponents of two to any value which is determined solely by the number of stages provided.

At the junction 44, the counting means 35 will either have a digital 1 or a digital 0 depending on the count contained in the system. The junction 44 is connected by conductor 45 to an output switch means 46 which can be any type of switch means capable of handling a load to which the switch means is adapted to be connected. A connection means 47 is disclosed along with a load 48. In a conventional heating system the switch means 46 could be a relay or a solid state switch means, and the connection could be to a load 48, such as a fuel valve in a furnace. The type of switch means 46 and load 48 are not material to the present invention.

The condition control device disclosed in FIG. 1 is completed by the addition of a time constant altering means generally disclosed at 50. The time constant altering means in the present disclosure includes a conventional relay coil 51 that is connected by a conductor 52 to the junction 44 to receive an energizing potential. It will be obvious that when a digital 1 appears at the junction 44, that the relay coil 51 is energized to the ground 17 to pull in an armature 53 that operates a single pole, double throw switch structure means disclosed at 54. When a 0 appears at the junction 44, it is obvious that the relay coil 51 is deenergized and that the switch means 54 is in the position as shown in the drawing. The switch means 54 has a common switch element 55 and a pair of switchable connections 56 and 57. The switchable connection 56 is connected through a first asymmetric current conducting means 60, while the second switchable connection 57 is connected through a second asymmetric current conducting means 61. The two asymmetric current conducting means 60 and 61 are joined by a common conductor 62 through a low value of resistance 63 to the junction 31 of the condition responsive control means 9. The junction 31 is at the capacitor 30 which forms part of the time constant circuitry of the condition responsive means. It will be noted that the two asymmetric current conducting means 60 and 61 are represented by simple diodes, and that they are oppositely poled in their connections in the circuit.

The resistor 63 is of quite a small value and is required as a practical matter for the proper electronic balance of the circuitry. The theory of the operation of the circuit, however, can completely disregard the existence of the resistance 63 as it is quite small. The diode 60 provides a charge path on one half cycle of the voltage that appears at junction 31, while the diode 61 provides a discharge path when the switch means 54 is in the other position.

Figure 2:
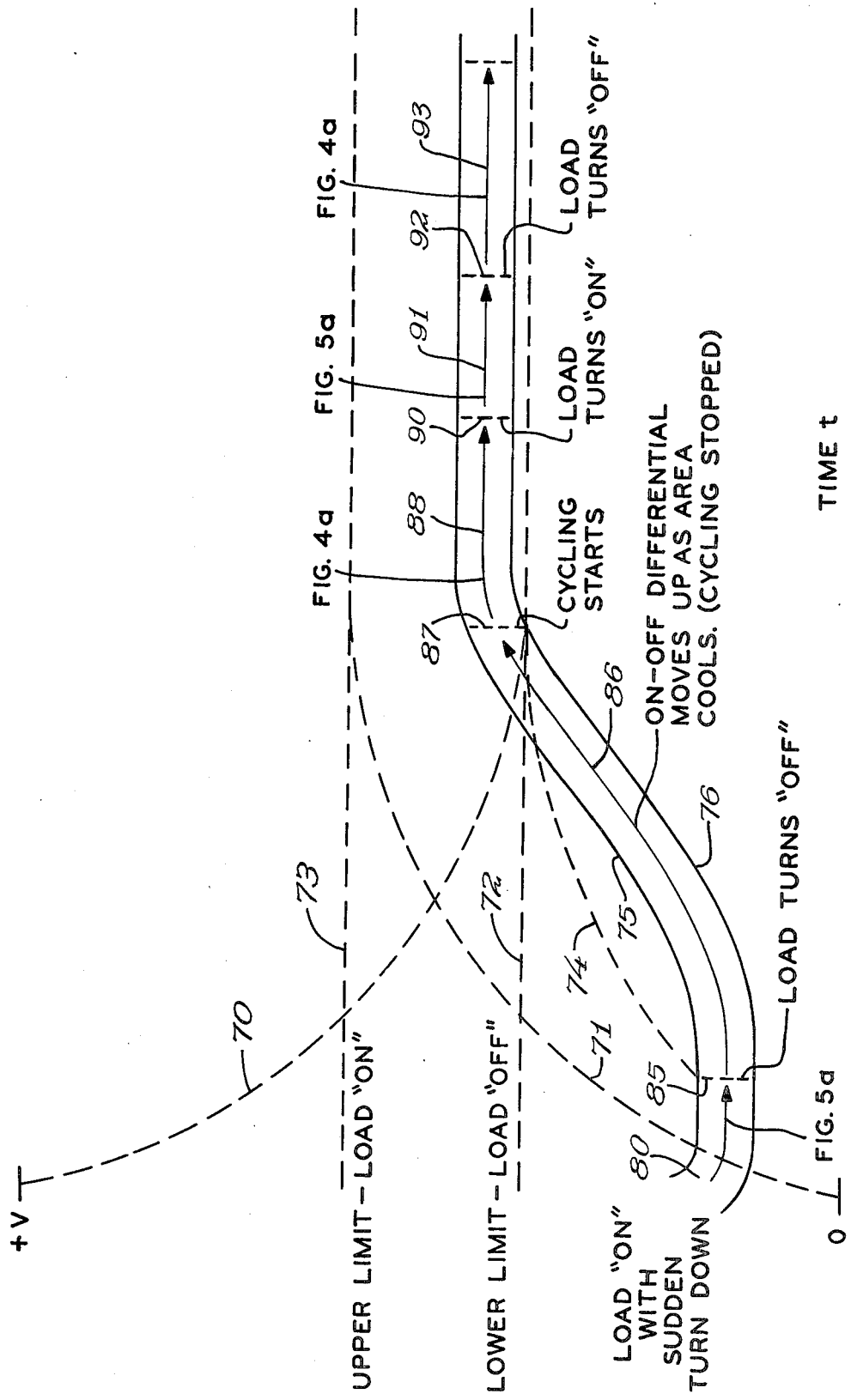
FIG. 2 is a composite wave form representation of the operation of the condition control device of FIG. 1.

A graphic representation of certain of the voltage versus time characteristics of the device of FIG. 1 is disclosed in FIG. 2. A brief description of FIG. 2 is believed in order prior to the use of FIG. 2 as a vehicle for an explanation of the operation of the device disclosed in FIG. 1. In FIG. 2 two voltage characteristic curves 70 and 71 are shown. The typical capacitive discharge curve 70 is for a load "off" condition in which the curve 70 approaches asymptotically a lower voltage limit 72, and the reverse curve 71 for a load "on" condition approaches an asymptotic limit 73. The limits 72 and 73 define a proportional band for the control device of FIG. 1 for one particular set of conditions. A further curve 74 is disclosed and would be the discharge curve at a slightly different operating point and time and which occurs after the load has turned "off" after a turn down of the control point has occured.

An "on-off" differential for the system is defined by a pair of curves 75 and 76 which are substantially parallel to one another and represent the range of the desired control. In a thermostat, the differential as defined by curves 75 and 76 is a matter of a small number of degrees in temperature that in turn correspond to a relatively small voltage shift in the bridge means 11 of FIG. 1. The relative value of resistor 26 determines the differential and the general position of the differential lines are determined by the relative values of the negative temperature coefficient sensor 10 and the setpoint 13. Included between the curves 75 and 76 are a number of progressive references to the characteristics of the type of cycling rate present at the junctions 25 and 31 of FIG. 1. The FIGS. 3a, 4a, 5a and 6a are representative of various capacitive charge and discharge curves of voltage versus time as taken at the junction 31. The curves shown as FIGS. 3b, 4b, 5b and 6b are voltage versus time curves taken at the junction 25 for the digital cycling that results from the voltage at junction 31. It will be noted that while the charge and discharge curve of the capacitor 30 taken at junction 31 is a typical resistance-capacitor curve, the output at the junction 25 is a digital switched output that varies in "off-on" time not only in the length of the "on" time but in the frequency with which the pulse occurs. The pulses appearing at junction 25 are used directly by the counting means 35.

OPERATION

Figure 5A:
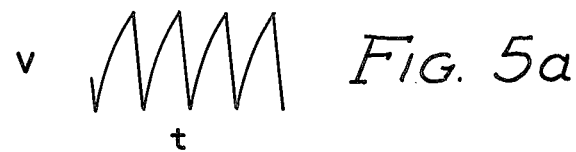
Figure 5B:
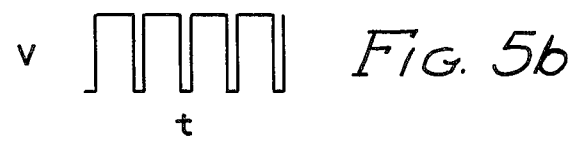
Figure 6A:
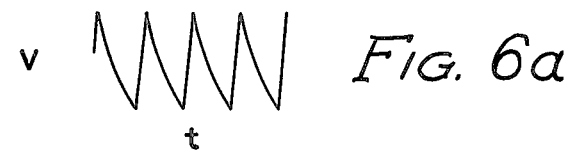
Figure 6B:
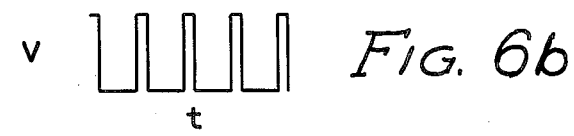

It is initially assumed that the switch means 46 and its associated load 48 is "on", and the setpoint potentiometer 13 is suddenly set down to a lower temperature. The differential shown by curves 75 and 76 at 80 is substantially below the proportional band shown by curves 72 and 73. At this point in time the system having been "on", the charge characteristics of the capacitor 30 will be similar to a lower section of curve 71. This is represented specifically by the curve as shown in FIG. 5a where the capacitor is at a sharply rising charge portion of the curve 71 thereby creating a rapid digital switching at junction 25 (as shown by FIG. 5b). Since the output was "on", the counting means 35 will not change until an appropriate number of cycles have passed through the counting means. As soon as a sufficient number of cycles have passed through the counting means 35, the counting means 35 will change from an "on" state having a 1 at junction 44 to a 0 or an "off" as disclosed at point 85. At this point in the operation of the system the typical charge curve for the capacitor 30 is represented by curve 74. As soon as the counting means 35 has counted out so that the junction 44 drops to a 0, the switch means 46 is deenergized and the load 48 turns "off" thereby turning "off" the furnace which has been supplying heat. Since the ambient was higher than the turned down temperature now called for by the position of the setpoint potentiometer 13, the "on-off" differential defined by curves 75 and 76 slowly drifts upward based on the heat loss of the ambient being controlled. This is represented by the portion of the curve identified at 86.

As soon as the bottom edge of the differential, as represented by curve 76, intersects with the capacitive charge curve 74 at 87, the differential established by the curves 75 and 76 now calls for the system to once again anticipate energizing the load 48. At point 87 the cycling of the system once again begins as noted at 88. The cycling of the portion of the curve 88 is represented by the FIG. 4a wherein the capacitor charges along the slope of a curve similar to curve 70. The cycling rate in the "on" state is slow relative to the cycling rate defined by curves disclosed in FIGS. 5 and 6, as the system is near the lower boundary of the proportional band established by the curves 72 and 73. As soon as a sufficient number of cycles occur in the segment 88, the counting means 35 counts up and provides a 1 or an output at junction 44. This occurs at the point 90 on the differential range of curves 75 and 76. At this point the output voltage at junction 44 goes to a 1 thereby energizing the relay 51 of the time constant altering means 50. The contact means 54 is pulled to the lower position thereby changing from the diode 60 to the diode 61 to change the charge and discharge characteristics of the capacitor 30. During the portion of the curve represented at 91, the cycling rate is represented by the curves of FIGS. 5a and 5b where the device is now operating on the load "on" characteristic section of curve 71 for the charge of the capacitor 30. The cycling rate during the portion of the curve designated at 91 is relatively rapid as is shown by the curves 5a and 5b, and again when a sufficient count has been provided to the counting means 35 the counting means 35 causes the output at 44 to go to a 0. As soon as the count goes to a 0, the relay 51 of the time constant altering means 50 changes back to the position shown in the drawings where diode 60 is placed in the circuit as opposed to diode 61. This changes the discharge characteristics for the capacitor 30 once again. The switching of the counting means 35 such that the output at 44 is a 0 once again places the system at point 92 on the differential curve between curves 75 and 76 into the mode where the load has been turned "off" as represented at the point 92. The cycling reverts to the type of cycling disclosed in FIGS. 4a and 4b as represented at 93.

The cycling continues alternating between the curves of the type disclosed in FIGS. 4 and 5 and the rate of the cycling changes with the position of the "on-off" differential between the curves 72 and 73 which represent the proportional band for the device. As the differential curves 75 and 76 move towards the upper curve 73 of the proportional band, the slopes and rates of the curves of the charge and discharge voltage at junction 31, and the frequency of the pulses and the width of the pulses at 25, vary to adjust for the point of operation, i.e., the ratio of the load "on" and "off" times.

It should be noted that each time the counting means 35 counts through a sufficient number of counts to change the digital output at junction 44 that the time constant altering means 50 changes position thereby changing the characteristics of the charge and discharge characteristics of the capacitor 30 to adjust the system properly for the relationship of the "on-off" differential disclosed at 75–76 with respect to the proportional range disclosed between the line 72 and 73.

Only one typical section of the mode of operation has been described. It will be apparent to anyone skilled in this art as to what happens as the actual sensed temperature varies with respect to the proportional band for the control system. It is further obvious that this control system can be used for any type of process variable where a condition responsive element operates in a time proportional mode. Also, a very simple time constant altering means in the form of a conventional relay and a pair of diodes have been disclosed. This conventional relay and diodes could be replaced by wholly solid state switching and would perform the same function. For these reasons, it is quite obvious that the specific embodiment utilized to carry out the present invention could be readily changed by one skilled in the art. In view of this, the applicant wishes to be limited in the scope of his invention solely by the scope of the appended claims.

The embodiments of the invention in which an exclusive property or right is claimed are defined as follows:

1. A condition control device, including: condition responsive time proportional control means having switched output means; said switched output means providing repetitively switched output signals at a rate representative of a time constant of said time proportional control means when said condition responsive means senses a condition which is within a preselected range; said switched output means providing constant output signals when said condition is outside of said selected range; time constant altering means connected to said time proportional control means to selectively alter said time constant of said time proportional control means; unidirectional counting means connected to said condition responsive repetitively switched output signals to count said output signals; said counting means changing the state of output means after a preselected count; and circuit means connecting an output means of said counting means to said time constant altering means to control the alteration of said time constant for said condition control means.

2. A condition control device as described in claim 1 wherein said condition responsive means is temperature responsive means.

3. A condition control device as described in claim 2 wherein said temperature responsive means includes a temperature responsive resistor as part of a bridge circuit.

4. A condition control device as described in claim 3 wherein said time constant of said temperature responsive means is provided by the charging and discharging of a capacitor.

5. A condition control device as described in claim 4 wherein said temperature responsive bridge circuit and said capacitor are connected to amplifier means; and said amplifier means having output circuit means to in turn provide said repetitively switched output signals between a high and a low state.

6. A condition control device as described in claim 1 wherein said time constant altering means includes switch means connected to said output circuit means of said counting means; and said time constant altering means further including oppositely poled asymmetric current control means; said asymmetric current control means being selectively connected within said time constant altering means to alter said time constant as a function of an output state of said counting means.

7. A condition control device as described in claim 6 wherein said oppositely poled asymmetric current control means includes a pair of diodes having a common connection and a pair of switchable connections; and said switch means selectively switching between said switchable connections to alter said time constant as a function of an output state of said counting means.

8. A condition control device as described in claim 7 wherein said switch means is a relay having a normally open and a normally closed contact means.

9. A condition control device as described in claim 7 wherein said condition responsive means is temperature responsive means including a temperature responsive resistor as part of a bridge circuit; and said time constant of said temperature responsive means is provided by the charging and discharging of a capacitor.

10. A condition control device as described in claim 9 wherein said temperature responsive bridge circuit and said capacitor are connected to amplifier means; and said amplifier means having output circuit means to in turn provide said repetitively switched output signals between a high and a low state.

11. A condition control device as described in claim 10 wherein said switch means is a relay having a normally open and a normally closed contact means.

12. A condition control device, including: condition responsive time proportional control means having digitally switched output means; said switched output means providing repetitively switched digital output signals at a rate representative of a time constant of said time proportional control means when said condition responsive means senses a condition which is within a preselected range; said switched output means providing constant output signals when said condition is outside of said selected range; time constant altering means connected to said time proportional control means to selectively alter said time constant of said time proportional control means; digital unidirectional counting means connected to said condition responsive repetitively switched output signals to digitally count said output signals; said counting means changing the state of output means after a preselected count; and circuit means connecting to an output means of said counting means to said time constant altering means to control the alteration of said time constant for said condition control means.

* * * * *